(12) United States Patent
Bergstrom et al.

(10) Patent No.: US 6,426,315 B1
(45) Date of Patent: Jul. 30, 2002

(54) PROCESS FOR INTRODUCING A FUNCTIONALITY

(75) Inventors: Jan Bergstrom, Balinge; Rolf Berglund; Lennart Soderberg, both of Uppsala, all of (SE)

(73) Assignee: Amersham Pharmacia Biotech AB, Uppsala (SE)

( * ) Notice: Subject to any disclaimer, the term of this patent is extended or adjusted under 35 U.S.C. 154(b) by 0 days.

(21) Appl. No.: 09/380,105

(22) PCT Filed: Mar. 4, 1998

(86) PCT No.: PCT/SE98/00386

§ 371 (c)(1),
(2), (4) Date: Mar. 14, 2000

(87) PCT Pub. No.: WO98/39364

PCT Pub. Date: Sep. 11, 1998

(30) Foreign Application Priority Data

Mar. 4, 1997 (SE) .............................................. 9700768

(51) Int. Cl.$^7$ ............................ B01J 31/00; B01J 20/00
(52) U.S. Cl. ...................... 502/159; 502/400; 502/401; 502/402; 502/404; 502/439
(58) Field of Search ................................ 502/159, 400, 502/401, 402, 404, 439

(56) References Cited

U.S. PATENT DOCUMENTS

| | | | | |
|---|---|---|---|---|
| 3,947,352 A | * | 3/1976 | Cuatrecasas et al. | 210/31 |
| 4,663,163 A | * | 5/1987 | Hou et al. | 424/101 |
| 4,874,520 A | * | 10/1989 | Lee | 210/635 |
| 5,089,138 A | * | 2/1992 | Shibata et al. | 210/635 |
| 5,137,638 A | * | 8/1992 | Namikoshi et al. | 210/635 |
| 5,561,097 A | * | 10/1996 | Gleason et al. | 502/402 |
| 5,801,116 A | * | 9/1998 | Cottrell et al. | 502/404 |
| 5,865,994 A | * | 2/1999 | Riviello et al. | 210/198.2 |
| 6,039,876 A | * | 3/2000 | Yang | 210/635 |
| 6,087,300 A | * | 7/2000 | Davankov et al. | 502/402 |
| 6,136,424 A | * | 10/2000 | Davankov et al. | 428/305.5 |

* cited by examiner

Primary Examiner—Elizabeth D. Wood
(74) Attorney, Agent, or Firm—Royal N. Ronning, Jr.; Robert F. Chisolm; Stephen G. Ryan

(57) ABSTRACT

Process for, in layers of a porous matrix, exhibiting the groups A, introducing a functionality using a reagent I, introducing the functionality by a reaction with the groups A. The characterizing feature is that the matrix is contacted with a functional deficiency of reagent I and that conditions and reagent I are chosen so that the reaction between reagent I and the groups A is more rapid than diffusion of reagent I in the matrix.

9 Claims, 5 Drawing Sheets

PROCESS FOR INTRODUCING A FUNCTIONALITY

TECHNICAL FIELD AND USE OF THE INVENTION

The invention relates to a process for preparing multifunctional porous matrices. Currently the principal use of the inventive matrices is separation of one or more components from a mixture of components dissolved or dispersed in a liquid. The matrices can also be used as solid phases for: a) the synthesis of oligopeptides and oligonucleotides, b) the analysis and determination methods utilizing affinity reactions, etc. There are also other uses.

Current separations involve that a liquid containing the component(s) is contacted with a matrix, wherein the component(s) to be separated is/are partitioned to the matrix and is/are thereby removed from the remaining components, which are differently partitioned to the matrix including not partitioned at al.

By the expression "partitioned to the matrix" is meant that a component is bound or is otherwise adsorbed on/in the matrix.

By components is meant individual substances/complex structures including whole cells and parts thereof.

TECHNICAL BACKGROUND

Synthesis of Separation Matrices and Associated Problems

To obtain components with sufficiently high purity several separation matrices with different function must often be used in separate steps. This has lead to thoughts of creating multifunctional matrices, which would give a reduction in the number of separation steps. Se e.g. our patent application "Matrices for separation and separation method exploiting said matrices", which has been filed concurrently with this application. We there describe matrices, involving two or more distinct layers which are different concerning separation characteristics.

The synthesis of matrices with given separation characteristics has often involved reacting a base matrix, exhibiting functional groups A, with a reagent I, which via reaction with the groups A gives the matrix a new functionality. A has often been hydroxy, amino (primary, secondary and tertiary), thiol, carboxy (—COOH/—COO—), alkenyl, such as in allyl. halogen etc and corresponding activated (reactive) forms. Since the groups A usually are localized throughout the matrix, earlier known techniques have involved the introduced functionalities have had a similar localization all throughout the matrices. By an introduced functionality is meant either a reactive group or a group contributing to the separation characteristics of the matrix. Reactive groups introduced have then been utilized for creating groups, which contribute to the separation characteristics of the matrix or other characteristics one wishes to utilize in matrix bound form.

According to earlier techniques it has not been possible to introduce layered functionalities in porous matrices. There is a need for new methods.

OBJECT OF THE INVENTION

The principal object of the invention is to enable preparation of porous matrices, which in their interior part exhibit layers with different functions, for separation matrices usually layers with different separating functions (separation layers).

THE INVENTION

The invention is a method for introducing a functionality on a porous matrix according to the methodology mentioned in Technical Background. The invention enables introducing a desired functionality in one or more well defined layers in the matrix. The invention is characterized in
 a) that the amount of reagent I, which the matrix is contacted with, is deficient compared to the groups A that exist in advance to reaction with reagent I, and
 b) that reagent I and the reaction conditions are selected so that the reaction between reagent I and the group A is rapid compared to transport of reagent I in the matrix (the reaction with group A is rapid compared to the diffusion of reagent I in the matrix).

By deficiency is meant that the amount of reagent I is not sufficient for a reaction with all A groups in the matrix. An inner layer of the matrix will remain unreacted at the same time as a layer with a new functionality is introduced by reagent I. When calculating deficiency, considerations should be made that reagent I can be depleted in side reactions, via vaporization etc.

By rapid reaction between group A and reagent I is also understood that reagent I is adsorbed locally to a group A in a rapid physico-chemical reaction. In this case, reagent I can be stabilized to the matrix by addition of one or more additional reactants promoting local binding to the matrix.

Typical examples group A according to the invention are hydroxy, amino, carboxy (—COOH/—COO—), mercapto, carbon-carbon double bond etc.

Reagent I can be any compound which can bind more rapidly to the matrix than it is diffusing through the matrix, provided that it introduces the intended function. The ratio between rate of diffusion and the rate of reaction with A can be optimized by proper selection of reagent I, taking in consideration that layer functionalisation is promoted by increasing the reactivity of reagent I for group A, and also by increasing the size of reagent I. The reactivity is often influenced by the solvent, pH, temperature etc. Suitable conditions are selected according to conventional practice for each reagent and the type of reaction which is to be performed. Nonpolar and polar organic solvents as well as organic solvents of intermediate polarity and mixtures thereof with each other, and where appropriate also with water, may often be better suited for the process of the invention than pure water.

Reagent I can be a compound which introduces the desired functionality provided the conditions appropriate for this to occur are met (rapid reaction with,the groups compared with transport in the matrix). For the synthesis of separation matrices, in this case reaction of reagent I with A introduces the separating characteristic in a predetermined layer.

Reagent I can also be a so called activating reagent. These are usually utilized for introducing reactive groups that are necessary for further functionalization and use of the matrix according to the introductory part. Activating reagents can be electrophilic, nucleophilic, based on free radicals etc.

On the date of priority we have mostly worked with reagent I in form of electrophilic reagents. Examples are $X_2$ or XOH (where X is a halogen such as chlorine, bromine, iodine) or any other halogenating reagent which easily gives away a positively or uncharged halogen. Most halogenating reagents, especially $X_2$ or XOH, give an instantaneous reaction with carbon-carbon double bonds. Carbon-carbon double bonds may result in vicinal dihalides or halohydrins as reactive groups, which easily are converted to reactive epoxy groups.

Usually reactive groups as such do not contribute with any useful separation characteristics. Therefore they are often further reacted with a compound B, which introduces the desired separation characteristic in the layer which has been activated according to the invention. Particular separation characteristics, which can be introduced by use of a compound B are given below under the heading "Introduced Separation Characteristic". Compound B can be selected to introduce reactive groups which in turn can be utilized for introducing separation characteristics via reaction with a compound C. Theoretically longer reaction sequences may be possible to use. Provided that it can be arranged so that compounds B, C etc diffuse slower than they react with previously introduced groups, the invention can also be applied to each of the reaction between compound B. C etc and previously introduced reactive groups.

If required, it can be suitable to introduce protecting groups which later can be removed. For example, if a reagent (reagent I, compound B, C etc) is to be transported through a layer wherein there are groups destroying the reagent.

The degree of cross-linking, the density or the porosity of the matrix is a special kind of functionality. It can be changed layerwise without adding a compound B. For the combination carbon-carbon double bond, as group A, and $X_2$ or XOH, as reagent I, cross-linking can be achieved in the layer activated according to the invention by a simple change of pH after activation (actually an addition of OH—(=compound B)). Alternatively, in some cases activation can be achieved at a pH which enables cross-linking.

A hydrophilic surface layer is usually obtained, if compound B is water, OH— or some other hydrophilic low molecular nucleophile, which can reacts with an introduced reactive group. If desired, remaining groups A in the inner part of the matrix can then be utilized for functionalization, e.g. according to the invention.

After a separation characteristic has been introduced in a layer, layers with other separation characteristics can be introduced. For example, by renewed activation of the matrix followed by a reaction with a compound B' which introduces separation characteristics other than those obtained with compound B. Additional layers do not necessarily have to be introduced according to the process of the invention. Also in this case there may be a need of introducing protecting groups.

Base Matrices that May Be Used in the Process of the Invention.

Suitable base matrices are often in the form of particles. They should be insoluble but wettable and often also swellable in the liquid medium in which they are to be used. Their inner and outer surfaces can be anything from hydrophilic to hydrophobic. Hydrophilic characteristics are achieved if the matrices on their inner and outer surface exhibit hydrophilic groups such as hydroxy (—OH), amino (—$NH_2$), carboxy (—COOH/—COO—), amido (—$CONH_2$), repeating groups —$OCH_2CH_2$— and —$OCH_2CH_2CH_2$—, —$OCH_2CH_2(CH_3)$—, etc. Hydrophobic characteristics can be achieved if hydrophobic groups are correspondingly present, e.g. hydrocarbon groups containing 2 or more carbon atoms. For intermediate hydrophilicity/hydrophobicity, the surface of the matrix often exhibits groups of both types.

The matrices are typically built of organic or inorganic polymers which can be of synthetic or biologic origin. Especially so called biopolymers can be mentioned.

Well known hydrophilic organic matrices are polymers exhibiting a number of hydrophilic groups of the types mentioned above. Known hydrophilic polymers are so called polyhydroxy polymers and polyamides, primarily polymers that are insoluble in aqueous media and for instance based on polyvinylic alcohol, poly(hydroxyalkyl methacrylates) and corresponding acrylates, polyacrylic and polymethacrylic amides (e.g. trisacrylic amides and trismethacrylic amides (tris=$(HOCH_2CH_2)_3CNH_3$), polysaccharides such as agarose, dextran, starch, pullulane, and cellulose, optionally cross-linked to make them suitable as separation matrices.

Well known hydrophobic organic matrices are porous forms of styrenedivinyl benzene polymers, poly(alkyl methacrylates), polymers of perfluorinated hydrocarbons (PFC) etc.

Inorganic variants of separation matrices can be based on porous forms of glass, zeolites, silica gel, composite material, zirconium oxide, etc.

Hydrophilic matrices, hydrophobic matrices, inorganic matrices etc. can be given the desired hydrophilicity/hydrophobicity via hydrophilization/hydrophobization.

The most preferred matrices on the date of priority were based on
 a) agarose in the form of beads optionally cross-linked and optionally also derivatized with dextran in the pores, e.g. grades marketed under the names of Sepharose® and Superdex®, respectively,
 b) cross-linked dextran in the form of beads, e.g. grades marketed under the name of Sephadex®,
 c) cellulose, e.g. grades marketed under the name of Sephacel®,
 d) cross-linked porous particles of polyacrylamide derivatized with dextran in the pores, e.g. Sephacryl®, and
 e) monodispersed and polydispersed porous particles, inter alia, of substantially hydrophobic material, e.g. styrene-divinyl benzene polymer, which have been hydrophilized e.g. grades marketed under the names of MonoBeads® and Source®. These trademarks correspond to products from Amersham Pharmacia Biotech AB, Uppsala, Sweden.

The density of the matrices can be higher, lower or the same as the liquid medium in which they will be used (density for matrix saturated with the liquid medium). Matrices in the form of particles can contain filler agents which determine their density. Se e.g. WO-A-9200799 (KemEnTek/Upfront Chromatography) and WO 9118237 (Pharmacia Biotech AB).

The requirements concerning the porosity (exclusion limit) of the separation matrices are primarily determined by mole weight and shape of the compounds which are to be separated. For the invention, it is also important that the porosity shall permit transport within the matrix of reagent I and often also of compound B.

Interesting exclusion limits are generally in the interval of $3-10^6$ Å. Within the technical field of the applicant, and the future patent owner, it may be especially advantageous with exclusion limits being at least 10 Å.

Introduced Separation Characteristic

The separation characteristics of the matrix are often determined by the groups it carries. Common groups in this context are:
 1. ion exchange groups
 2. bioaffinity groups
 3. hydrophobic groups
 4. groups that can be utilized for covalent chromatography
 5. sulphur-containing groups e.g. for so called thiophilic interaction, 6. chelate or chelating groups,
7. groups with aromatic systems giving rise to so called π—π-interaction with different compounds,
8. groups giving hydrogen bonds
9. cross-linking groups
10. Hydrophilic groups etc.
11. polymeric groups.

In the context of the invention, it is often arranged so that compound B or B' or the corresponding entities in subsequent reactions exhibitany of the groups 1–11. These groups can also be created as a consequence of the reaction between compound B and reactive groups being introduced. in a layer according to the invention in an earlier step. The latter is especially true for smaller groups of type 1 or any of the types 3–9. In some cases, the groups can also be introduced directly with reagent I.

Ion exchanging groups can be anion exchanging, such as primary, secondary, tertiary, quaternary ammonium group, sulphonium group etc, or cation exchanging, such as carboxylate (—COO—), phosphonate or phosphate (—$PO_3^2$— and —$OPO_3^2$—, respectively), sulphonate or sulphate (—$SO_3$— and —$OSO_3$—, respectively) etc. In the groups —COO—, —$PO_3^2$—, —$OPO_3^2$—, —$SO_3$— and —$OSO_3$— the free valence binds directly to a carbon atom.

Well known bioaffinity groups are single members of the pairs a) antigen/hapten and antibody (including antigen or hapten binding fragment thereof), b) nucleic acid and its complementary counterpart, c) lectin and carbonhydrate structure, d) IgG binding protein and protein exhibiting the part of IgG that binds to such a protein, e) sense and antisense based affinitysystems etc. Bioaffinity groups also include groups originating from synthetically prepared organic molecules and which "mimic" the affinity for naturally occurring biospecific affinity, so called "mimetics".

Hydrophobic groups are often hydrocarbon groups containing a few or no oxygen, nitrogen or sulphur atoms. Typical examples of hydrophobic groups are straight, branched and cyclic saturated, unsaturated or aromatic hydrocarbon groups.

Among groups which can be utilized for covalent chromatography can be mentioned disulphide groups, mainly reactive disulphide groups (—S—S—$R^1$) and free thiol groups (—SH). An example of $R_1$ is 2-pyridyl. For further examples of $R^1$ see e.g. U.S. Pat. No. 4,647,655 (Pharmacia AB).

Among sulphur containing groups which can be utilized for thiophilic interaction there can be mentioned groups being essentially hydrophobic but in which there is one or more thioether structures. See e.g. Oscarsson & Porath WO-A-9533557; Porath EP-A-165912; and Porath EP-A-168363.

Hydrogen binding groups have previously been utilized (Belew, Berglund, Bergström, Söbderberg, SE 9600590-5 (=WO 97 29825) (incorporated by reference). This type of groups often exhibits a weak anion exchanging ammonium group (primary, secondary or tertiary) with a hydroxy group at a distance of 2 or 3 carbon atoms from the ammonium nitrogen.

Cross-linking groups can be introduced directly by use of reagent I. See above. Alternatively a compound B can be utilized, which is capable of binding two or more reactive groups simultaneously.

Hydrophilic groups according to the invention are mainly single hydroxy and lower hydroxyalkyl with one or more hydroxyl groups or groups containing repeating groups —$CH_2CH_2O$—. The groups often are low molecular, e.g. less than 25 carbon atoms.

Polymeric groups with or without ligands can give gel filtration characteristics. The polymers can be cross-linked.

Suitable groups are typically coupled to the matrix via a bridge which can be of varying structure according to known techniques. The bridge structure can be polymeric, e.g. a hydrophilic or a hydrophobic polymer, having one or more of the groups 1–11 according to the above on each bridge. Common bridge names have been tentacles, "extender", fluff, "linker", "spacer" etc. Hydrophobic bridges are mainly suited for hydrophobic liquid media and often have better availability and capacity for introduced groups 1–11. The corresponding is true for hydrophilic bridges in combination with hydrophilic liquid media. Examples of hydrophilic polymer bridges are polysaccharides, such as dextran, and other water soluble polyhydroxy polymers.

Further Aspects of the Invention

One aspect of the invention is matrices which can be prepared according to the invention. These matrices contain one or more layers having different functionality. The substitution degree for at least one ligand from the groups 1–11 in one layer is often different from the substitution degree for the same ligand in another layer. In many embodiments of the matrices of the invention, the substitution degree of a ligand in the surface layer is zero or close to zero, while at the same time the same ligand is present in an inner layer. Also the reversed can be true.

A further aspect of the invention is the use of the matrices for separation according to the introductory part.

Separation, depending on choice of matrix and groups introduced (see above), can be designed as affinity chromatography or as chromatography based on size and shape of the compounds which are to be separated (gel filtration), or as corresponding batchwise procedures. Packed bed as well as stabilized fluidized/expanded bed can be utilized. Examples of affinity chromatography are ion exchange chromatography (anion exchange, cation exchange), bioaffinity chromatography, hydrophobic interaction chromatography (HIC), covalent chromatography, thiophilic chromatography, chelate based chromatography, chromatography based on π—π-interaction etc. In principle, conditions and protocols are chosen in accordance with previous knowledge for the respective type of separation procedure.

The separation can be performed from mixtures containing similar or very different components, everything from single small molecules up to individual components that are complexly attached to each other, such as in particulate aggregates, bioaffinity complexes, animal and plant cells and parts there of, microorganisms and parts thereof etc. Interesting substances are, inter alia, nucleic acid including oligonucleotides, proteins including peptides, lipids and other organic and inorganic compounds.

Separation can involve that the component of interest: a) is partitioned to the matrix while undesired substances remain in the liquid medium or b) remains in the liquid medium while undesired substances are partitioned to the matrix.

The invention will now be presented with a number of non-limiting examples. The invention is defined in the enclosed patent claims constituting a part of the specification.

EXPERIMENTAL PART

Example 1

Preparation of Q Sepharose 4 Fast Flow Ion Exchanger with a Lock in the Outer Layer of the Bead A. Preparation of cross-linked allylated agarose in particle form (allylated Sepharose 4 Fast Flow). Sepharose 4 Fast Flow was from Amersham Pharmacia Biotech AB, Uppsala, Sweden. The matrix consists of cross-linked agarose, average particle size 90 μm, prepared by a reaction between epichlorohydrin and agarose in the presence of NaOH according to Porath et al (J. Chromatog. 60 (1971) 167–77 and U.S. Pat. No. 3,959,251). Allylation is achieved by reacting the finished particle with allylglycidyl ether with NaOH as a base to an allyl level ($CH_2=CHCH_2OCH_2CHOHCH_2-$) of 0.26 mmole/mL gel.

B. Dissolving of dextran with a weighed average molecular weight of 500 000. Dextran T500 is commercially available from Amersham Pharmacia Biotech AB and consists of hydrolyzed and fractioned raw dextran from Leuconostoc mesenteroides. 12.8 g of Dextran T500 is dissolved in 39.0 mL distilled water in a 250 mL three necked flask with slow stirring.

C. Partial bromination of cross-linked allylated agarose. 30 mL drained allylated agarose prepared according to step A, 30 mL distilled water and 0.64 g anhydrous NaOAc are added to a 100 mL reaction vessel. Subsequently bromination is achieved by loading of 0.25 mL bromine with vigorous stirring. On calculation of the amount of bromine, it has been taken into consideration that a part of the volatile bromine will be evaporated. The reaction is continued for a few minutes until the mixture is purely white. After bromination, the gel is washed on a glass filter with distilled water.

D. Coupling of Dextran T500. The gel from step C is aspirated dry and transferred to the reaction vessel containing dissolved Dextran T500 from step B with careful stirring. The mixture is allowed to equilibrate for 1 hour. Subsequently, the reaction is started by addition of 2.98 g NaOH and 0.12 g $NaBH_4$ dissolved in 27.2 mL distilled $H_2O$. The temperature is set to 35° C. and the reaction is allowed to continue over night (e.g. 16 h) with careful stirring. The stirring is stopped and the reaction mixture is filtered on a glass filter. After the most of Dextran T500 has been washed away with distilled water, neutralisation is performed with a few mL of concentrated HOAC directly in the filter funnel to pH <7, preferably 5–6, and then the gel is washed again with distilled water. After coupling, the remaining allyl level was 0.19 mmole/mL.

E. Bromination of remaining allyl groups. 20 mL drained allylated agarose modified with a layer of Dextran T500 in the outer part of the beads, prepared according to step D, 4.53 mL distilled water and 0.8 g anhydrous NAOAc and 0.4 mL bromine are added with vigorous stirring to a 100 mL three-necked flask. Stirring is continued until the yellow colouring/excess of bromine is eliminated.

F. Introduction of ion exchanging groups via remaining allyl groups. The introduction of anion exchanging quaternary amine groups ($(CH_3)_3N+CH_2CHOHCH_2-$ is continued directly in the same three necked flask as in E. 9.9 g of 65% trimethyl ammoniumchloride (TMAC) is loaded into the flask. Stirring for 10 minutes and then loading of 3.0 g of NaOH dissolved in 3.0 g distilled water. On loading of this 50% NaOH solution the mixture becomes pale yellow. Immediately thereafter 0.06 g of $NaBH_4$ is loaded thereto. The temperature is set to 24° C. and stirring is initiated. The reaction is continued over night (e.g. 16 h). The reaction is stopped by neutralization directly in the flask to pH <7 with a few mL of concentrated HOAc, preferably to pH 5–6, and then the gel is washed repeatedly by distilled water and with a few gel volumes of 1.0 M NaCl. Eventually, the gel is washed again repeatedly with distilled water. The capacity of ion exchange was determined by silver chloride titration to 0.132 mmole/mL.

G. Microscopic evaluation of Q Sepharose 4 Fast Flow Ion Exchanger with a lock in the Outer Layer of the Bead. All microscopic evaluations were conducted in a microscope with variable setting of phase contrast at a magnification of 200. The starting matrix Sepharose 4 Fast Flow of example 1 and the and finished Q Sepharose 4 Fast Flow ion exchanger with a lock of example 1 were stained with haematoxylin for comparison. In the latter case, the lock could be seen clearly in the outer layer of the beads in the microscopic photo taken. To be able to observe optically that the lock beads are working, finished Q Sepharose 4 Fast Flow lock ion exchanger was incubated for a few minutes with bovine CO-haemoglobin at pH 8.2; 0.020 M Tris-HCl buffer. The excess of CO-haemoglobin was washed away with the same buffer. The beads were then observed in a microscope without any previous additional staining. On a the microscopic photo the red CO-haemoglobin in the inner part of the beads could be seen but nothing of the CO-haemoglobin could be seen in the Dextran T500 lock layer of the beads.

Example 2

Preparation of Q Sepharose 6 Fast Flow Ion Exchanger with a Lock in the Outer Layer of the Bead A. Preparation of cross-linked allylated agarose in particulate form (allylated Sepharose 6 Fast Flow). Sepharose 6 Fast Flow was from Amersham Pharmacia Biotech AB, Uppsala, Sweden. The matrix consists of cross-linked agarose, average particle size 90 μm, prepared by reaction of epichlorohydrin and agarose in the presence of NaOH according to Porath et al (J. Chromatog. 60 (1971) 167–77 and U.S. Pat. No. 3,959,251). Allylation is performed in such a way that the finished particle is reacted with allyglycidyl ether with NaOH as a base to a allyl level ($CH_2=CHCH_2OCH_2CHOHCH_2-$) of 0.27 mmole/mL gel.

B. Dissolving of Dextran with a weighed average molecular weight of 500 000. Dextran T500 is commercially available from Amersham Pharmacia Biotech AB and consists of hydrolyzed and fractionalized raw dextran from Leuconostoc mesenteroides. 57.7 g of Dextran T500 is dissolved in 157 mL distilled water in a 500 mL three necked flask with slow stirring.

C. Partial bromination of cross-linked allylated Agarose. 90 mL drained allylated agarose prepared according to step A, 90 mL distilled water and 1.92 g of anhydrous NaOAc are added to a 500 mL three-necked flask. Subsequently bromination is achieved by loading of 0.69 mL bromine with vigorous stirring. On calculation of the amount of bromine, it has been taken into consideration that a part of the volatile bromine will be evaporated. The reaction is continued for a few minutes until the mixture is purely white. After bromination the gel is washed on a glass filter with distilled water.

D. Coupling of Dextran T500. The gel from step C is aspirated dry and transferred to the reaction vessel with dissolved Dextran T500 from step B with careful stirring. The mixture is allowed to equilibrate for 1 hour. Subsequently the reaction is started by addition of 10.39 g NaOH and 0.36 g $NaBH_4$ dissolved in 41.6 mL distilled $H_2O$. The temperature is set to 35° C. and the reaction is allowed to continue over night (e.g. 16 h) with careful stirring. The stirring is stopped and the reaction mixture is filtered on a glass filter. After washing away of most of the Dextran T500 with distilled water, neutralisation is performed with a few mL of concentrated HOAc directly in the filter funnel to pH <7, preferably 5–6, and then the gel is washed again with distilled water. After coupling the remaining allyl level was 0.18 mmole/mL.

E. Bromination of remaining allyl groups. 40 mL drained allylated agarose with a layer of Dextran T500 in the outer part of the beads, prepared according to step D, 9.06 mL distilled water and 1.6 g anhydrous NaOAc and 1.0 mL bromine are added with vigorous stirring to a 250 mL three-necked flask. Stirring is continued until the yellow colouring/excess of bromine is eliminated.

F. Introduction of ion exchanging groups via remaining allyl groups. The introduction of an ion exchanging quaternary amine groups $(CH_3)_3N^+CH_2CHOHCH_2$— is continued directly in the same three-necked flask as in E. 19.9 g of 65% trimethyl ammoniumchloride (TMAC) is loaded into the flask. Stirring for 10 minutes and then loading of 6.0 g of NaOH dissolved in 6.0 g distilled water. On loading of this 50% NaOH solution the mixture becomes pale yellow. Immediately thereafter 0.12 g of $NaBH_4$ is loaded. The temperature is set to 24° C. and the stirring rate to 130 RPM and the reaction is continued over night (e.g. 16 h). The reaction is stopped by neutralization directly in the flask to pH <7 with a few mL of concentrated HOAc, preferably to pH 5–6, and then the gel is washed repeatedly by distilled water and with a few gel volumes of 1.0 M NaCl. Eventually the gel is repeatedly washed again with distilled water. The capacity of ion exchange was determined by silver chloride titration to 0.142 mmole/mL.

G. Chromatographic evaluation of Dextran T500 Q Sepharose 6FF. The effect of the outer dextran layer was tested by chromatography utilizing gradient runs on HR5/5 columns (Amersham Pharmacia Biotech AB) packed with about 1 mL ion exchanger. A large protein thyroglobulin 660 kD, and a small α-lactalbumin 14.4 kD were used as samples at pH 8.2, at which both are negatively charged. FIG. 1 shows the separation of both proteins in a gradient run on a conventional strong anion exchanger, Q-Sepharose HP, without size based restriction of the availability to the positively charged Q ligands. Here α-lactalbumin (peak 1) elutes before thyroglobulin (peak 2). FIG. 2 shows the result from a gradient run with thyroglobulin on Dextran T500 Q Sepharose 6FF ion exchanger according to this example. This large protein migrates right through the column without being adsorbed. The smaller α-lactalbumin which was run in a similar way is adsorbed and eluted in the gradient (peak 2). See FIG. 3.

Example 3

Synthesis of Cat-anion Exchanger by Use of Layer Activation

A. Synthesis. 5 ml of allylated Sepharose HP with an allyl level of about 0.2 mmole/mL, prepared analogously with the procedure in examples 1 and 2 by reacting Sepharose HP with allylglycidyl ether in water with sodium hydroxide as a base, was suspended in 20 mL distilled water in a glass reaction vessel and was brominated with vigorous stirring with 0.3 mmole elementary bromine. The partially brominated gel was then reacted with 25 mL of 0.1 M sodium hydroxide solution saturated with sodium sulphite. Reaction at 40° C. over night. The reaction was stopped by neutralization with acetic acid and subsequent washing in a glass filter funnel with about 100 mL distilled water. Remaining allylic groups on the partially functionalized matrix were brominated in 20 mL distilled water with an excess of bromine by dropwise loading of elementary bromine until a remaining yellow colouring of the gel suspension was obtained. The brominated partially functionalized matrix was then washed on a glass filter funnel with distilled water and loaded in 25 mL of a 50% solution of bis-(3-amino propyl)amine. Reaction at room temperature with stirring over night. The reaction was stopped by neutralization with 50% hydrochloric acid and subsequent washing in a glass filter funnel with about 100 mL distilled water.

B. Chromatographic evaluation of layered cat-anion exchanger. About 1 mL of cat-anion exchanger prepared according to specification above was packed in a HR5/5 column (Amersham Pharmacia Biotech AB), was connected to a FPLC system and equilibrated with a pH 6.0 buffer. The protein samples were adsorbed and then eluted by use of a salt gradient also at pH 6.0.

Sample A. Lysozyme, a protein which is positively charged at pH 6.0, was run according to above. See chromatogram in FIG. 4, which shows that lysozyme can be bound to the negative sulphonate ligands of the matrix and then be eluted.
Sample B. Transferrin, ovalbumin and β-lactoglobulin, proteins which are negatively charged at pH 6.0, were run according to above. See chromatogram in FIG. 5, which shows that transferrin, ovalbumin and β-lactoglobulin can be bound to the positively charged amine ligands of the matrix and then be eluted.
The result from chromatography tests A and B shows that there is regions/layers in the particles, which only contain positively charged groups and regions/layers with only negatively charged groups.

Figure 1:
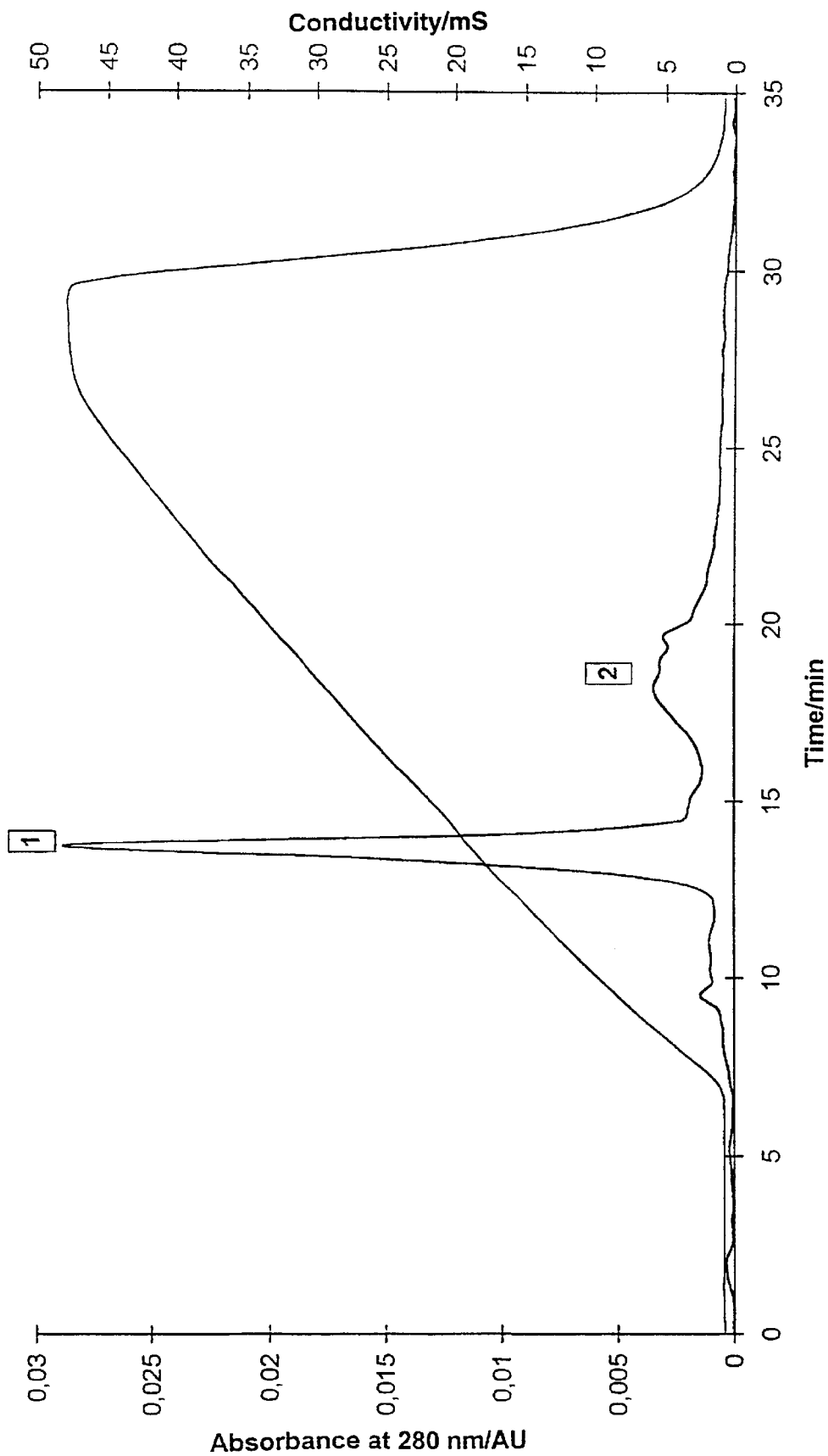
FIG. 1. Chromatogram from the 50 μl sample mixture run containing 0.5 mg/mL α-lactalbumin (peak 1) and 0.5 mg/mL thyroglobulin (peak 2) on a HR 5/5 column (Amersham Pharmacia Biotech) containing Q Sepharose HP, bed height 5.9 cm.
Buffer A: 20 mM Tris-HCl pH8.2.
Buffer B: 20 mM Tris-HCl+0.5 M NaCl
Flow rate: 1 mL/min
FIG. 2. Chromatogram from the 200 μl sample run containing 0.25 mg/mL α-lactalbumin on a HR 5/5 column (Amersham Pharmacia Biotech) containing Dextran T500 Q Sepharose 6FF according to example 2, bed height 6.5 cm.
Buffer A: 20 mM Tris-HCl, 50 mM NaCl pH 8.2.
Buffer B: 20 mM Tris-HCl+1 NaCl
Flow rate: 0.2 mL/min
FIG. 3. Chromatogram from the 200 μl sample run containing 1 mg/mL thyroglobulin on a HR 5/5 column (Amersham Pharmacia Biotech) containing Dextran T500 Q Sepharose 6FF according to example 2, bed height 6.5 cm.
Buffer A: 20 mM Tris-HCl, 50 mM NaCl pH 8.2.
Buffer B: 20 mM Tris-HCl+1 NaCl
Flow rate: 0.2 mL/min
FIG. 4. Chromatogram from a 50 μl sample run containing 1 mg/mL lysozyme on a HR 5/5 column (Amersham Pharmacia Biotech) containing cat-anion exchanger according to example 3, bed height 4.2 cm.
Buffer A: 20 mM piperazine —HCl pH 6.0
Buffer B: 20 mM piperazine —HCl+1 NaCl
Flow rate: 0.5 mL/min
FIG. 5. Chromatogram from a 50 μl sample run containing 0.1 mg/mL transferrin (peak 1), 0.2 mg/mL ovalbumin (peaks 2 and 3) and 0.2 mg/mL β-lactoglobulin (peak 4 cat-anion exchanger according to example 3, bed height 4.2 cm.
Figure 2:
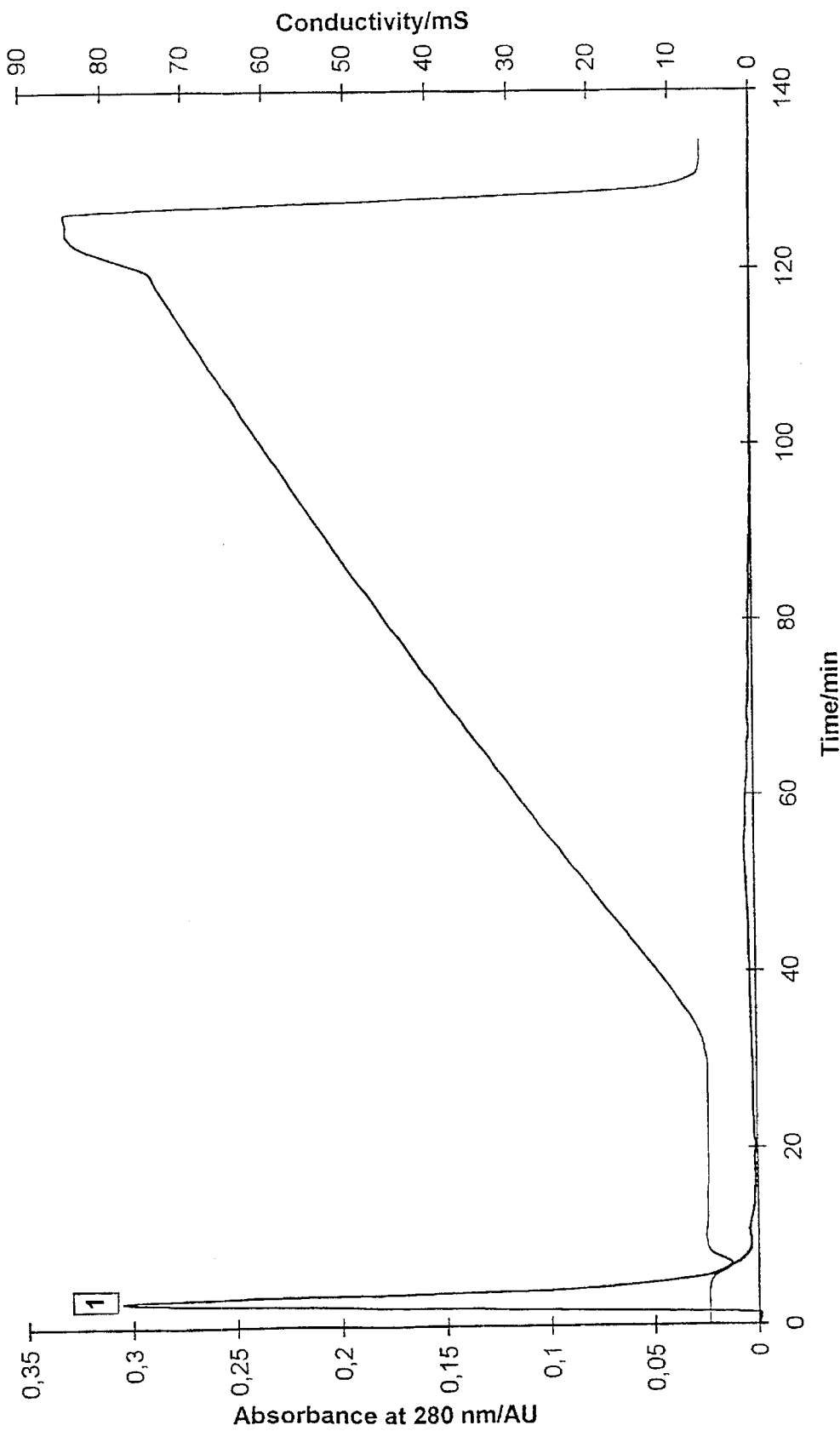
Figure 3:
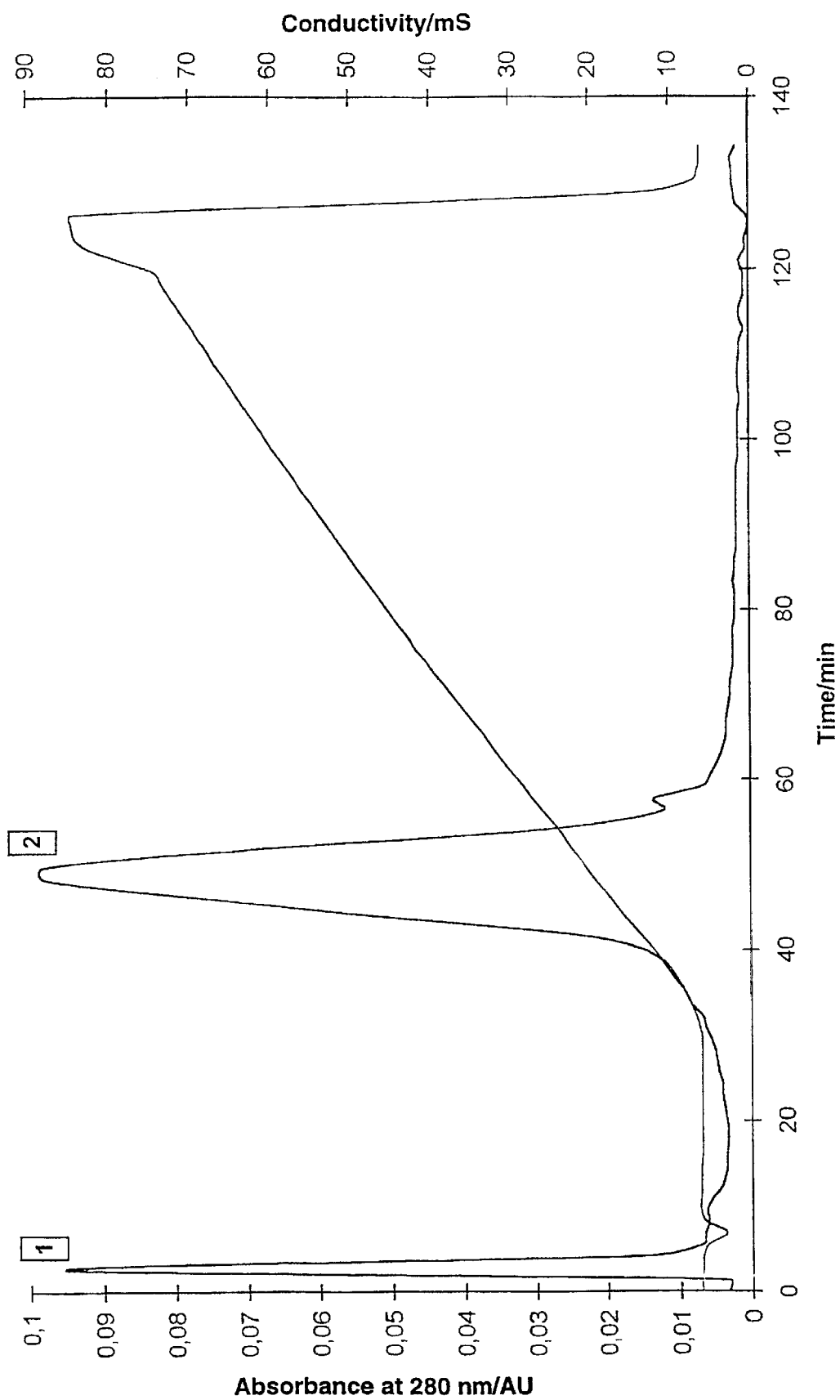
Figure 4:
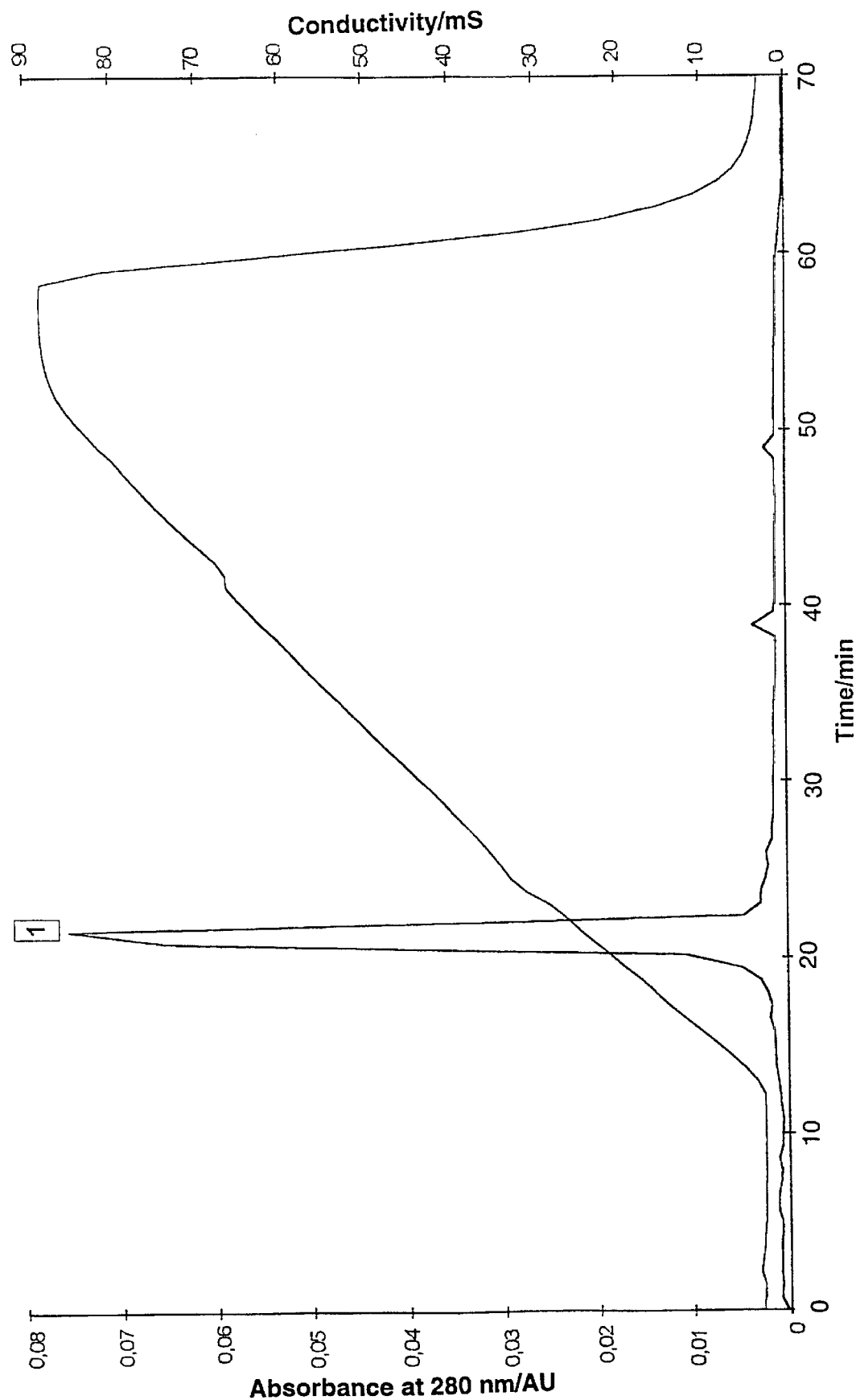
Figure 5:
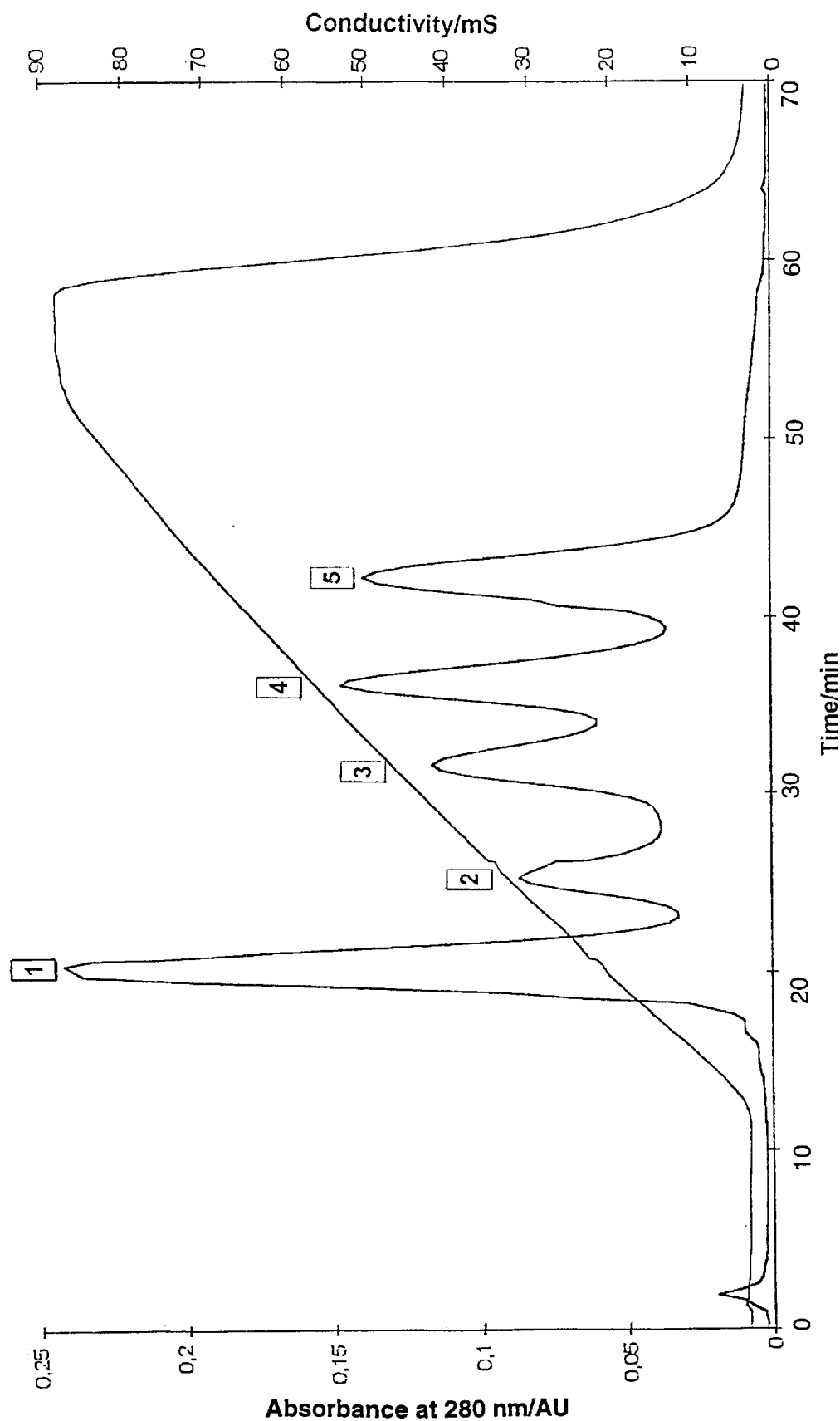

Buffer A: 20 mM piperazine —HCl ph 6.0
Buffer B: 20 mm piperazine —HCl+1 NaCl
Flow rate: 0.5 mL/min

What is claimed is:

1. In a process for introducing a functionality in layers of a porous matrix containing groups A, for use of a reagent I by reaction of said functionality with the said groups A, the improvement comprising contacting the matrix with a deficiency of reagent I, under conditions such that the reaction of reagent I and the groups A is more rapid than the diffusion of reagent I in the matrix.

2. A process according to claim 1, characterized in that A is a carbon-carbon double bond and that reagent I is a halogenating reagent.

3. A process according claim 1, characterized in that reagent I is $X_2$ or XOH, wherein X is a halogen selected from chlorine, bromine and iodine.

4. A process according to claim 1, characterized in that the functionality which is being introduced is a reactive group that in a subsequent step is reacted with a compound B introducing a desired separation characteristic to the matrix.

5. A process according to claim 1, characterized in that the matrix is hydrophilic and exhibits hydrophilic groups on its inner and outer surfaces.

6. A process according to claim 1, characterized in that the matrix is built of a polyhydroxy polymer.

7. A process according to claim 1, characterized in that the reaction of the groups A and reagent I is performed in an aqueous medium.

8. A process according to claim 4, characterized in that the desired separation characteristic introduced by compound B is affinity chromatography.

9. A process according to claim 4, characterized in that the desired separation characteristic introduced by compound B is gel filtration.

* * * * *